United States Patent Office 3,061,516
Patented Oct. 30, 1962

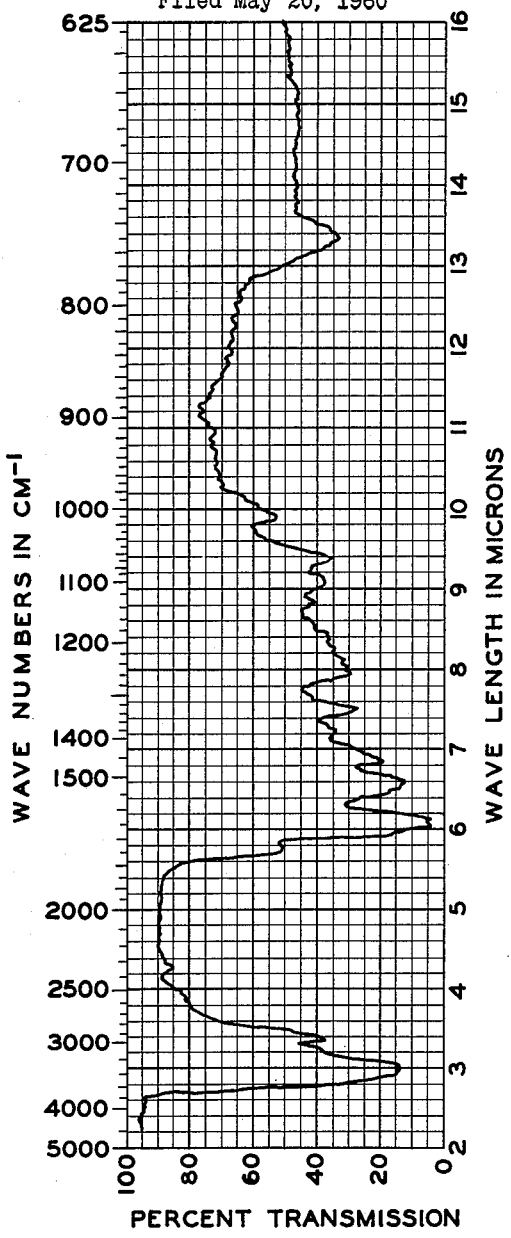

3,061,516
TELOMYCIN AND ITS PRODUCTION
Irving R. Hooper, Oliver B. Fardig, and Joseph Lein, Fayetteville, N.Y., assignors to Bristol-Myers Company, New York, N.Y., a corporation of Delaware
Filed May 20, 1960, Ser. No. 30,500
11 Claims. (Cl. 167—65)

This invention relates to a new and useful antibiotic, called C159 originally and now given the name telomycin, and to its production. More particularly, it relates to processes for its production by fermentation and methods for its recovery, purification and conversion to metal and acid addition salts. The invention embraces the antibiotic and its salts in dilute solutions, as crude concentrates, as purified solids and in pure, crystalline forms.

This application is a continuation-in-part of our prior, copending application Serial Number 611,734, filed September 24, 1956, now abandoned.

There is now provided according to the present invention a member selected from the group consisting of a polypeptide antibiotic substance, designated telomycin, effective in inhibiting the growth of Gram-positive microorganisms, containing among others the amino acids serine, hydroxyproline, aminobutyric acid, glycine, alanine, threonine and aspartic acid being soluble in methanol and insoluble in acetone, diethyl ether and butyl acetate and in purified form containing substantially 56.1% carbon, 6.1% hydrogen, 13.2% nitrogen and 24.6% oxygen (by difference), decomposing on heating in the range of 220°–240° C. (turning a tan color), exhibiting $[\alpha]_D$ of about $-12°$ (c.=1 in equal volumes of water and methanol), exhibiting when dissolved in 0.1 N HCl at 0.1 mcg./ml. in maximum absorption of ultraviolet light at 333–335 m$\mu$ $$(E_{1\,cm.}^{1\%} = 158-174)$$

and at 274–275 m$\mu$ $$(E_{1\,cm.}^{1\%} = 105-128)$$

and exhibiting characteristic absorption spectra in the infra-red region of the spectrum when pelleted in potassium bromide as shown in the drawing, including characteristic absorption maxima at the following wave lengths expressed in microns: 2.95, 3.00, 3.23, 3.35, 3.40, 3.47, 5.75, 5.93, 6.03, 6.10, 6.40, 6.46, 6.51, 6.60, 6.62, 6.68, 6.72, 6.84, 6.88, 7.24, 7.30, 7.51, 7.92, 8.02, 8.12, 8.25, 8.40, 8.95, 9.05, 9.40, 9.92, 10.05, 10.15 and 13.30.

There is further provided, according to the present invention, the process of producing this antibiotic substance which comprises cultivating a telomycin-producing strain of Streptomyces canus in an aqueous carbohydrate solution containing a nitrogenous nutrient under submerged aerobic conditions until substantial antibacterial activity is imparted to said solution and then, if desired, recovering the so-produced antibiotic from the fermentation broth.

The organism producing the antibiotic of the present invention was isolated from samples of soil and is a new strain of Streptomyces canus. Two cultures of the living organism isolated from these soils and given the laboratory designations of C159 and C509 have been deposited in the American Type Culture Collection, Washington, D.C., and added to its permanent collection of microorganisms as A.T.C.C. 12646 and 12647, respectively.

Transfers of Streptomyces canus (culture C159) grow well at 28–30° C. on asparagine-dextrose, Bennett's and tomato oatmeal agars. Vegetative mycelium, growing in agar substrata, is colorless to flax. A gray aerial mycelium develops on the second or third day and gives rise to numerous, loosely wound sporophores (on some media). Soluble pigments are formed in tones of yellow to yellowish-green on certain media.

The following carbohydrates are readily utilized when included in Pridham and Gottlieb synthetic agar containing no other source of carbon: dextrin, starch, glycerol, arabinose, rhamnose, xylose, glucose, levulose, maltose, lactose, cellobiose, galactose, manitol, inositol, sorbitol, sodium acetate, sodium citrate, sodium succinate, and calcium malate. Sucrose, raffinose, inulin, dulcitol, sodium oxalate, sodium salicylate, and sodium tartrate did not support growth.

A more detailed description of Streptomyces canus (culture C159) on a number of media commonly used in the study of members of the genus Streptomyces is given in Table I. The type of growth, pigment production, and other characteristics are noted. Media were seeded by streaking and all cultures were incubated at 28–30° C. for a 21-day period. The capitalized color names used in the description correspond to those in Maerz and Paul, A Dictionary of Color, Ed. 2, New York, McGraw-Hill, 1950.

Streptomyces canus (culture C159) produces an alkaline reaction in litmus milk with no coagulation; peptonization took place slowly. Gelatin was liquefied slowly, but no soluble pigment was produced. Blood agar was not hemolyzed. There was no darkening of peptone iron agar.

TABLE I

Cultural Characteristics of Streptomyces canus
(culture C159)

| Medium | Amount of growth | Vegetative growth | Aerial mycelium and spore color | Soluble pigment | Remarks |
|---|---|---|---|---|---|
| Asparagine-dextrose agar | Fair | Colorless | White to gray | None | Reverse flax. |
| Bennett's agar | Good | Flax | Gray | do | Reverse sallow. |
| Nutrient agar | Fair | Colorless | Scant white | do | Reverse colorless. |
| Czapek's agar | Fair, thin | Flax | Fair gray | do | Reverse gray. |
| Calcium malate | Fair | Amber white | White to gray | Slight yellowish | Fair clearing of agar. |
| Tomato-oatmeal agar | Good | Flax | Gray | Yellowish-green | Reverse bronze-sheen. |
| Potato plug | do | Cream | Woodash to gray | Mauve taupe | |

The antibacterial spectrum in vitro of telomycin was tested by the tube dilution technique to determine the minimum concentrations of the antibiotic completely inhibiting growth of bacteria for 24 hours. Heart infusion broth was used as the medium for all test organisms, except as otherwise noted. The following results were obtained.

| Organism: | Minimum inhibitory concentration, mcg./ml. |
|---|---|
| *Micrococcus pyogenes* var. *aureus* #209 | 8 |
| *Micrococcus pyogenes* var. *aureus* #52–79 (penicillin resistant) | 31.2 |
| *Gaffkya tetragena* | 31.2 |
| *Streptococcus agalactiae* | 6.25 |
| *Diplococcus pneumoniae* [1] | 6.25 |
| *Lactobacillus acidophilus* [2] | 125 |
| *Lactobacillus casei* [2] | 125 |
| *Bacillus anthracis* | 16 |
| *Bacillus cereus* var. *mycoides* | 125 |
| *Bacillus subtilis* | 6.25 |
| *Corynebacterium xerosis* | 1.6 |
| *Escherichia coli* | >1,000 |
| *Shigella sonnei* | >1,000 |
| *Klebsiella pneumoniae* | >1,000 |
| *Proteus vulgaris* | >1,000 |
| *Pseudomonas aeruginosa* | >1,000 |
| *Neisseria* sp. | >1,000 |
| *Candida albicans* | >1,000 |

[1] Heart infusion + 10% serum.
[2] Tomato juice broth.

Telomycin is effective against Gram positive organisms. Test organisms have shown no cross-resistance between telomycin and other known antibiotics.

Telomycin was not lethal to a mouse when injected by the intravenous route at 750 mg./kg. dissolved in water in a 2 percent concentration; a dose of 1000 mg./kg. was lethal.

Telomycin dissolved in an 8 percent ethanol solution successfully protected mice infected by intraperitoneal inoculation with a lethal dose of *Diplococcus pneumoniae* at 1.75 mg./kg. when treated by the intraperitoneal route, at 13.5 mg./kg. when treated by the intramuscular route, at the time of infection. Treatment by the oral route at 500 mg./kg. did not effectively control the experimental infection.

It is to be understood that for the production of the antibiotic, this invention is not limited to this particular microorganism but particularly includes the use of microorganisms which are natural isolates, variants or mutants produced from the described organism by mutating agents such as X-radiation, ultraviolet radiation and nitrogen mustards.

The following is the agar plate diffusion assay used to determine the activity of samples of the antibiotic:

*Culture medium.*—A suitable preparation may be made by suspending in one liter of distilled water to a final pH of 8.0 a mixture of 1.5 grams beef extract, 3 grams yeast extract, 6.0 grams peptone and 15 grams agar. The suspension is allowed to stand for five minutes, mixed until a uniform suspension is obtained and heated gently with stirring. The suspension is boiled for one or two minutes or until solution has occurred. The culture medium is then dispensed and sterilized at 121° C. (fifteen pounds per square inch of steam pressure, gauge, for fifteen minutes).

*Inoculum.*—The test organism is *Bacillus subtillis* ATCC 6633. A spore suspension containing 50,000,000 viable spores per ml. is added to melted assay agar (cooled to 53° C.) to give a final inoculum concentration of 2%.

*Preparation of plates.*—Twenty-one ml. of sterile assay agar are placed in level sterile Petri plates and allowed to solidify. Four ml. of inoculated agar are then distributed evenly over the surface of the base layer. Stainless steel assay plates are placed on the medium after the latter has cooled to room temperature.

*Buffer.*—A phosphate buffer at pH 8.0 is used for making dilutions. This is prepared by mixing 95 ml. of molar $K_2HPO_4$ with 5 ml. of molar $KH_2PO_4$ and diluting the mixture to one-tenth concentration with distilled water. The pH of the buffer must be checked potentiometrically and, if necessary, adjusted to pH 8.0 by the addition of one or the other molar phosphate solutions. Variations in pH or concentration of the buffer affect the sizes of inhibition zones markedly. It has not been found necessary to sterilize the buffer. The molar stock solutions are preserved with chloroform and toluene and fresh working solutions are prepared daily.

*Assay.*—Unknown samples are diluted, if required, in the pH 8.0 phosphate buffer. Three depressions on each plate are used to receive a single dilution of the sample. Following incubation at 32° C. the diameter of the zones are measured and averaged.

The antibiotic exhibits low toxicity and potent activity against bacteria, particularly Gram-positive bacteria. The contemplated utility of telomycin in human and veterinary medicine has not yet been demonstrated.

In the submerged, aerobic fermentation of the organism to produce the new antibiotic, the carbohydrate solution used contains as a source of carbon a commercially available sugar, other carbohydrate or glyceride oil and as a source of nitrogen inorganic salts such as ammonium sulfate and sodium nitrate and organic materials, often in crude form, such as corn steep liquor, distillers solubles, yeast, soybean meal and when desired mineral salts and buffering agents such as calcium carbonate; such medium ingredients include those listed in Canadian Patent 513,324 and in British Patents 730,341 and 736,325 and in U.S. Patents 2,691,618, 2,658,018, 2,653,899, 2,586,762, 2,516,080, 2,483,892, 2,609,329, 2,709,672, 2,723,216 and 2,757,123.

The following examples illustrate the preparation of fermentation broths containing the antibiotic.

EXAMPLE I

*Streptomyces canus* (culture C509) was aerobically fermented for 72 hours at 27° C. on a rotary shaker. The medium (100 ml.) in a 500 ml. Erlenmeyer flask was sterilized for 30 minutes at 15 lbs. and then inoculated with a 42-hour vegetative growth at the rate of 2%. The aqueous medium contained 3% polysaccharide (Argo; resynthesized dextrin), 1% corn steep liquor, 0.5% $K_2HPO_4$, 0.5% NaCl, 0.5% $NaNO_3$ and 1% soybean meal. The final potency of the antibiotic broth as measured by the bioassay described above was 20.2 mm. (undiluted) and 18.5 mm. (diluted three-fold).

EXAMPLE II

Culture C509 of *Streptomyces canus* was fermented in a 1000 gallon fermenter using the medium of Example I inoculated with a 72-hour vegetative seed. The broth potency after 60 hours was 25 mm. (undiluted) and 22 mm. (diluted three-fold).

EXAMPLE III

*Streptomyces canus* (culture C159) was fermented without agitation and with aeration at 74 cubic feet per minute at 29.5° C. for 120 hours in a medium (600 gallons) containing 1.0% glucose (Cerelose), 1.0% soybean meal, 0.5% sodium chloride, 0.1% calcium carbonate and 0.05% Curbay B.G. brand of distillers solubles. The pH was 7.4 at the start of the fermentation, fell to 6.0 and then rose as high as 8.4, finishing at 8.0. The final potency of the antibiotic broth was 14.7 mm. undiluted and 12.5 mm. diluted three-fold.

EXAMPLE IV

*Streptomyces canus* (culture C159) was fermented without agitation and with aeration at 74 cubic feet per minute at 29.5° C. for 100 hours in a medium (610 gallons) containing 1.0% Cerelose, 1.0% soybean meal, 0.5% sodium chloride, 0.1% calcium carbonate and 0.05% distillers solubles. The pH was 7.1 at the start of the fermentation and rose gradually to about 7.9. The potency of the antibiotic broth after 70 hours by the bioassay described above was 14.9 mm. undiluted and 12 mm. diluted three-fold.

EXAMPLE V

*Streptomyces canus* (culture C159) was aerobically fermented for 72 hours at 27° C. on a rotary shaker. The medium (100 ml.) in a 500 ml. Erlenmeyer flask was sterilized 30 minutes at 15 lbs. and then inoculated with a 32-hour vegetative growth at 1%. The aqueous medium contained 1.0% Cerelose, 0.05% Curbay brand of distillers solubles, 0.5% sodium chloride, 0.1% calcium carbonate and 1.0% soybean meal. The final potency of the antibiotic broth was 17.4 mm. undiluted and 14.0 diluted three-fold. The pH at harvest was 8.0.

Telomycin is isolated from fermentation broths by filtering to remove the mycelium, adjusting the pH of the filtered broth to about 8.5 and adsorbing on a chromatographic grade of magnesium silicate (e.g. 5 pounds Magnesol per 100 gallons of filtered broth). After collection of the solids by filtration, the antibiotic is eluted from the cake, as with one-tenth volume a 1:1 mixture of water and methanol. The solid antibiotic is then recovered from the eluate, e.g. by concentration by distillation in vacuo followed by lyophilization or spray-drying of the aqueous concentrate. During such concentration the pH is maintained in the range 6.5 to 7.5.

In another procedure, the elution is carried out with a mixture of 3 parts n-butanol and one part water using one-tenth the volume of the filtered broth. After repetition, the combined eluates are concentrated and dried completely by distillation in vacuo, maintaining the pH in the range of 7 to 8, to one-tenth or one-twentieth their original volume. After filtration, the antibiotic is precipitated from this clear, anhydrous concentrated solution in butanol, e.g., by the addition of mixed lower alkanes such as four to five volumes of Skellysolve B.

Use may also be made of solvent extraction. Thus, the antibiotic is extracted from filtered broth at pH 2.5, 6.0 or 9.0 by n-butanol but not by chloroform or methyl isobutyl ketone. The preferred pH range for the extraction is about 8.2–8.5 and the antibiotic is recovered from the butanol extract by concentration until it crystallizes out or by azeotropic drying followed by lyophilization, or precipitation by the addition of Skellysolve B.

Telomycin may also be recovered by adsorption on activated charcoal (e.g. Darco KB) from filtered broth followed by elution with a mixture of equal parts of n-butanol and water acidified to pH 3.0 with hydrochloric acid. Solids are then recovered from the eluate as above.

The following examples are for purposes of illustration only and not of limitation and illustrate the recovery of the antibiotic from a fermentation broth in both crude and purified form.

EXAMPLE VI

Fermentation broth (570 gallons) obtained according to Example III was filtered with the admixture of 2.4% filter aid. The pH of the filtrate was adjusted to 8.5 by the adidtion of 50% sodium hydroxide and then stirred for about 30 minutes with five pounds of Magnesol per 100 gallons filtrate. The Magnesol cake was collected and eluted with a solution of equal parts of methanol and water whose volume was one-tenth that of the filtered broth. This eluate was then concentrated by distillation in vacuo to give 32 l. of an aqueous solution of the antibiotic assaying 19.7 mm. undiluted and 17.1 mm. diluted threefold.

A portion (1300 ml.) of this aqueous concentrate was lyophilized to give 26 g. telomycin assaying (at 1 mgm./ml.) 12.9 mm. undiluted and 10.0 mm. diluted threefold.

Another portion (200 ml.) of this aqueous concentrate at pH 8.0 was extracted four times with one-quarter volumes of n-butanol. The butanol extracts were combined and concentrated to a volume of 40 ml. by distillation in vacuo. Twenty milliliters of this dry concentrate in butanol was added to 80 ml. Skellysolve B, precipitating 170 mgm. solid telomycin assaying at 1 mgm./ml. 18.2 mm. undiluted and 17.9 mm. diluted threefold. The other 20 ml. of butanol concentrate was distilled in vacuo with the addition of water to give 15 ml. of aqueous concentrate which was then lyophilized to give 329 mgm. solid antibiotic assaying, at 1 mgm./ml., 17.0 mm. undiluted and 15.0 mm. diluted threefold.

EXAMPLE VII

Fermentation broth (460 gallons) obtained according to Example IV was filtered at the harvest pH of about 7.1 with the admixture of 2.4% filter aid. The pH of the filtrate was adjusted to 8.5 by the addition of 50% sodium hydroxide. The filtrate was then stirred about 30 minutes with Magnesol (5 pounds per 100 gallons filtrate). The Magnesol cake was collected and eluted by stirring twice with about 40 gallons of a mixture of three parts n-butanol and one part water. The combined eluates were concentrated by distillation in vacuo to a volume of about 16 liters, assaying 17.0 mm. when diluted ten-fold. In this process there also precipitated 185 g. wet, solid antibiotic assaying, at 1 mgm./ml., 12.9 mm. undiluted and 10.0 mm. diluted three-fold.

Eleven liters of the butanol concentrate were concentrated by distillation in vacuo to a volume of 1350 ml. which was added to four volumes of Skellysolve B to precipitate solid antibiotic telomycin assaying, at 1 mgm./ml., 19.9 mm. undiluted and 17.2 mm. diluted three-fold, and weighing 26 g. after drying.

The potency of these solids was increased by slurrying them in methanol (2 ml./g.), removing undissolved solids by filtration and adding diethyl ether (four volumes) to precipitate the antibiotic. The methanol-ether mother liquor contained only inactive impurities.

EXAMPLE VIII

A purified sample of telomycin was prepared by counter-current distribution in six funnels using as the upper phase a mixture saturated with water of 1 part n-butanol and 1.5 parts methyl isobutyl ketone and as the lower phase water buffered with 0.02 molar phosphate at pH 6.0 and saturated with both n-butanol and methyl isobutyl ketone. It had been previously determined that this pair of solvent systems gave a distribution ratio of one. One gram of solid telomycin was dissolved in 100 ml. aqueous phase and placed in a separatory funnel with 100 ml. of the upper, solvent phase. After mixing and separating, the lower phase was transferred to a second funnel and mixed with fresh upper phase; fresh aqueous phase was added to the upper solvent phase left in the starting funnel. This countercurrent flow was continued in the usual manner until five more transfers had been made.

The aqueous phases from tubes 2, 3 and 4 were combined and extracted with butanol. This butanol was added to the combined solvent phases from the same tubes and the mixture was azeotropically dried and lyophilized to give 140 mgm. purified solid telomycin, assaying at 1 mgm./ml. 23.0 mm. undiluted, 20.0 mm. diluted three-fold and 17.5 mm. diluted nine-fold.

Craig countercurrent distribution studies of telomycin between an upper phase of tert-butyl alcohol and a lower phase of water containing 4 percent sodium chloride gave a single, symmetrical peak with a maximum at tube 148 when 200 transfers were made.

As shown in the drawing, when pelleted in potassium bromide telomycin exhibits characteristic absorption bands in the infra-red region of the spectrum at the following wave lengths expressed in microns: 2.95, 3.00, 3.23, 3.35, 3.40, 3.47, 5.75, 5.93, 6.03, 6.10, 6.40, 6.46, 6.51, 6.60, 6.62, 6.68, 6.72, 6.84, 6.88, 7.24, 7.30, 7.51, 7.92, 8.02, 8.12, 8.25, 8.40, 8.95, 9.05, 9.40, 9.92, 10.05, 10.15 and 13.30.

The antibiotic was found by two directional paper chromatography after hydrolysis by heating to 150° C. in a sealed tube in the presence of 0.38 N barium hydroxide for 1.5 hours or 20% hydrochloric acid for 5 hours to contain the amino acids glycine, α-alanine, threonine and aspartic acid.

A sample of telomycin which gave one identical weight and activity peak in the Craig countercurrent distribution apparatus using the 2-butanol:aqueous acetic acid system was refluxed in 6 N HCl at 125° C. for 30 hours. The solution was concentrated to dryness; redissolved in water, filtered, reconcentrated and stored in the presence of isopropyl alcohol (10%). The hydrolysate was developed on paper sheets using the techniques of two-dimensional paper chromatography using a butanol-water-acetic acid (4:5:1) system followed by butanol:water: pyridine (1:1:1). When the sheet was treated with ninhydrin seven spots were observed. They corresponded to aspartic acid, serine, glycine, hydroxyproline, threonine, α-alanine, and an unclassified spot which might be tyronine or tryptophane. A repeat experiment revealed 8 ninhydrin-positive spots. They appeared in the positions of aspartic acid, glycine, serine, hydroxyproline, threonine, β-alanine, α-amino butyric acid, and near leucine.

Telomycin hydrolysate was chromatographed through a CG-120, fraction D, resin column using citrate buffer as developing solution. The column was developed first with pH 3.25 buffer followed by pH 4.25 buffer. Quantitative ninhydrin determinations were made on the elauate fractions. Results indicated aspartic acid, serine, glycine and alanine to be present in equi-molar proportions and threonine to be present at twice that proportion. One ninhydrin-positive fraction was not identified. Amphomycin contains histidine, aspartic acid, glycine, glutamic acid, proline, valine and one other amino acid and does not contain α-alanine or threonine.

Telomycin is insoluble in acetone, ether and butyl acetate, is soluble in methanol and is precipitated from solution in methanol by the addition of acetone or ether.

Telomycin is very soluble in slightly alkaline aqueous solution but considerably less soluble in acidic aqueous solution. Thus, one gram in solution in 20 ml. water at pH 8.8 was gradually acidified; upon reaching pH 4.4 a heavy precipitate formed and the activity of the solution was reduced to about one-half its original value. Upon reaching pH 3.7 only about one-tenth the activity remained in solution.

Telomycin solubility in water was observed to vary with the pH of the solution. Minimum solubility, about 4 mg./ml., occurred at pH 3.0 to 3.3. Maximum solubility, at pH about 8.5, was greater than 150 mg./ml. In the presence of inorganic salts, such as sodium chloride or sodium sulfate, water solubility was greatly depressed in both acid and alkaline solutions. Maximum solubility was less than 1 mg./ml. in 10 percent sodium chloride solution. The antibiotic was moderately soluble in alcohol solvents, was only very slightly soluble in acetone and ethyl acetate, and was insoluble in ether, chloroform, and hydrocarbons.

Telomycin was stable to heat in aqueous solution. Solutions stored at 56° C. for two months lost less than 10 percent of their activity. Solutions have been autoclaved at 15 lb. pressure for 15 minutes with little attendant loss of activity.

Telomycin can react as an acid and is converted to ammonium, substituted ammonium and metal salts, such as sodium, potassium, calcium, magnesium, aluminum and the like by adding the appropriate base, e.g. calcium hydroxide, sodium hydroxide, to an aqueous solution of the antibiotic. The solid metallic salts are isolated, e.g. by lyophilization, if desired.

Non-aqueous neutral equivalents determined for telomycin were as follows: 1413, 1133, 1362, 1120, 1396 and 1425.

*Preparation of Crystalline Forms*

Three forms of crystalline telomycin solids have been prepared and designated type I, type II, and type III, according to their water solubility and their mode of preparation. Type I material is solid crystallized from a concentrated butanol extract of a water solution of the antibiotic. This product was moderately soluble in water. Type II material is solid crystallized from a concentrated butanol extract of the antibiotic following pretreatment with .03 N HCl in butanol or methanol by refluxing for about two hours. This product is very soluble in water. Type III material is a solid crystallized from water by gradual cooling of a hot water solution. It may also be prepared by allowing aqueous suspensions or solutions of type I and type II materials to stand after seeding with crystals.

(a) *Preparation of type III crystals.*—Telomycin was crystallized from water by solution at elevated temperature and very gradual cooling, with seeding and continuous agitation during the cooling period. Twenty-five grams of solid type I crystals precipitated in the plant from butanol were mixed with 1250 ml. of water. The pH was 5.8. All solid was not dissolved. The mixture was heated to 65–70° C. to give a clear solution which was filtered hot to remove extraneous solid. The solution was immersed in a large water bath at 75° C. and allowed to cool to room temperature very slowly. The solution was mixed continuously and was seeded with crystals when about 55° C. Precipitation commenced as amorphous solid which gradually became completely crystalline. After 16 hours mixing, the crystals were separated by filtration and dried under vacuum. Twenty-one and four tenths grams of white crystalline solid were obtained. This material was further dried at 100° C. for 16 hours at 10 mm. mercury pressure. It was designated as 127 and used in comparisons with other types of crystals.

A portion of sample 127 was recrystallized. It was mixed with water at 2 grams per 100 ml. and heated. The mixture lost turbidity at about 75° C. but all solid had not dissolved at 95° C. The clear solution was separated from insoluble solids and allowed to cool slowly in a water bath initially at 85° C. After 16 hours mixing, sample was cooled in ice for 4 hours, then filtered and dried. Potency of the material was 1900 units/mg.

Type I and type II crystals, samples 125 and 126, were mixed with water to form solutions of 20 mg./ml. concentration, warmed to about 60° C., and cooled slowly to room temperature over a period of 3 hours. Type III crystals precipitated during the cooling period. The solubility of telomycin in the mother liquor following 16 hours standing at room temperature, was 1 to 2 mg./ml.

(b) *Preparation of type II crystals.*—Twenty-five grams of telomycin were dissolved in 250 ml. of methanol to which 7.5 ml. of 1 N HCl had been added. The solution was refluxed for two hours. Water was added and the solution adjusted to pH 3.7. The solution was extracted with butanol and the butanol extract concentrated under vacuum. The extract was warmed to 65° C. and seeded with type II crystals and allowed to cool gradually. The crystalline precipitate was separated, dried and assayed. Eight grams of material were recovered. This material was further dried at 100° C. for 16 hours at 10 mm. mercury pressure and designated as sample 129.

Crystalline solid which was very soluble in water was prepared by reflux of telomycin with dilute HCl in water solution. The method was the same as described above except that water was substituted for methanol in the reflux step. Solid precipitated from the concentrated butanol extract without seeding. The solubility in water indicated this material to be type II crystals.

(c) *Preparation of type I crystals.*—Crystalline telomycin type I prepared by the concentration of a butanol extract of a water solution of the antibiotic was dried at 100° C. for 16 hours at 10 mm. mercury pressure and labeled sample 128. It was used for comparison with other types of crystal forms.

Comparison of Types I, II and III

Physical properties of the three crystal types were compared to determine what differences exist between the various crystal types. Samples 127, 128 and 129 were used as representative of each crystal form. The observations are listed below:

The antibiotic of the present invention is a useful agent for the detection of contamination by Gram-negative bacteria, fungi, yeasts and the like in the course of the commercial production of the enzymes streptokinase and streptodornase by the growth of Streptococci and the production of amylase by fermentation of *B. subtilis* or *B. cereus*. Thus, the addition of 1 to 1000 mcg./ml., and preferably about 10 mcg./ml., of the antibiotic to an aliquot of inoculated medium followed by incubation, per-

| Analytical determination | Type I (128) | Type II (129) | Type III (127) |
|---|---|---|---|
| Re 135 | | | |
| Volatiles (Abderhalden-4 hrs. at 100° C .vac. <20 mg. Hg), percent. | 1.4 | 1.5 | 1.6. |
| Moisture (Carl Fischer), percent | 1.9 | 2.4 | 2.1. |
| Butanol (gas chromatography), percent | 0.07 | 2.1 | 0.20. |
| elemental analysis (corr. for volatiles), percent: | | | |
| C | 55.80 | 56.20 | 56.14. |
| H | 5.40 | 6.62 | 6.12. |
| N | 14.10 | 13.50 | 13.20. |
| S | Nil | Nil | Nil. |
| Cl | Nil | Nil | Nil. |
| Residue | 3.1 | 0.53 | 2.9. |
| Ultraviolet spectrum (0.1 mcg./ml. in 0.1 N HCl): | | | |
| $E_{1\ cm.}^{1\%}$ of absorption peaks | 169 at 333 m$\mu$, 116 at 274 m$\mu$ | 174 at 334 m$\mu$, 128 at 275 m$\mu$ | 158 at 335 m$\mu$, 105 at 275 m$\mu$. |
| Infrared spectrum | | All spectra are the same | |
| Melting point | Decomp. (turns tan) 230–240° C. | Decomp. (turns tan) 220–230° C. | Decomp. (turns tan) 235–240° C. |
| Specific rotation: | | | |
| 0.05 N HCl | | −122.2 | −115.6. |
| | | −121.1 [1] | |
| NaOH, pH 11.6 | −116.7 | | |
| MeOH | −13.6 | −15.1 | −12.5. |
| MeOH:H₂O (1:1) | −11.3 | −12.3 | −12.6. |
| Microscopic appearance before drying | Long, thin needles, blunt ends, parallel extinction. | Same as Type I | Same as Type I. |
| After vacuum drying | No change | Somewhat fragmented | No change. |
| Solubility [2] in water at room temperature | 5 mg./ml | >100 mg./ml | <1 mg./ml. |
| | | >100 mg./ml. [1] | |
| Methanol | 20 mg./ml | 20 mg./ml | 20 mg./ml. |
| Methanol:water (1:1) with HCl to 0.05 N | >80 mg./ml | >80 mg./ml | >80 mg./ml. |

[1] Crystals from aqueous-acid reflux.
[2] Solubility of Types I and II are crude initial solubility values since solutions precipitate Type III crystals on standing.

Additional Solubility Data on Type III Crystals

Some further observations on the solubility of type III (127) telomycin were made. The crystalline solids were shaken for as long as 16 hours in water at various acid concentrations. At 0.01 N and 0.1 N HCl concentration, the mother liquor assayed 0.2–0.4 mgm./ml. At acid concentrations up to 6 N HCl solubility was less than 1.4 mgm./ml. Precise determinations at the higher acid concentrations were not carried out. In 3 N HCl and more concentrated solutions, a greenish yellow color developed in solution and in undissolved solid. Crude evaluation of solubility was made with a number of solvents by the addition of increments of solid to a milliliter portion of solvent. After shaking, the solubility was estimated by the visual observation of undissolved solids in the tube. The results obtained are listed below.

| Solvent: | Solid maximum dissolved, mg./ml. |
|---|---|
| Ethanol | 30 |
| n-Butanol | <8 |
| t-Butanol | <4 |
| Acetone | <4 |
| Formamide | >40 |
| Methanol:water (95–5) | 60 |
| Ethanol:water (95–5) | 20 |
| Butanol:water (90–10) | <8 |
| Acetone:water (90–10) | 50 |

Solubility varied considerably with temperature and was greatly increased upon heating. For maximum precipitation, cooling in ice water was necessary.

A comparison of the physical properties of types I, II and III showed no significant differences other than that of solubility in water and alcohol.

By the ultracentrifuge method the molecular weight of telomycin was found to be in the 1700 range.

mits the growth of undesirable contaminants and their visual detection.

We claim:

1. A member selected from the group consisting of a polypeptide antibiotic substance, designated telomycin, effective in inhibiting the growth of Gram-positive microorganisms containing among others the amino acids serine, hydroxyproline, aminobutyric acid, glycine, alanine, threonine and aspartic acid, being soluble in methanol and insoluble in acetone, diethyl ether and butyl acetate and in purified form containing 56.1% carbon, 6.1% hydrogen, 13.2% nitrogen and 24.6% oxygen (by difference), exhibiting a molecular weight of 1700 as determined by the ultracentrifuge method, decomposing on heating in the range of 220°–240° C. (turning a tan color), exhibiting $[\alpha]_D$ of −12° (c.=1 in equal volumes of water and methanol), exhibiting when dissolved in 0.1 N HCl at 0.1 mcg./ml. maximum absorption of ultraviolet light at 333–335 m$\mu$ $$(E_{1\ cm.}^{1\%} = 158\text{--}174)$$

and at 274–275 m$\mu$ $$(E_{1\ cm.}^{1\%} = 105\text{--}128)$$

and exhibiting characteristic absorption spectra in the infra-red region of the spectrum when pelleted in potassium bromide as shown in the drawing, including characteristic absorption maxima at the following wave lengths expressed in microns: 2.95, 3.00, 3.23, 3.35, 3.40, 3.47, 5.75, 5.93, 6.03, 6.10, 6.40, 6.46, 6.51, 6.60, 6.62, 6.68, 6.72, 6.84, 6.88, 7.24, 7.30, 7.51, 7.92, 8.02, 8.12, 8.25, 8.40, 8.95, 9.05, 9.40, 9.92, 10.05, 10.15 and 13.30; and its sodium, potassium, calcium, magnesium and aluminum salts.

2. A compound according to claim 1 in substantially pure form.

3. Telomycin, a polypeptide antibiotic substance effective in inhibiting the growth of Gram-positive microorganisms, containing among others the amino acids serine, hydroxyproline, aminobutyric acid, glycine, alanine, threonine and aspartic acid, being soluble in methanol and insoluble in acetone, diethyl ether and butyl acetate and in purified form containing 56.1% carbon, 6.1% hydrogen, 13.2% nitrogen and 24.6% oxygen (by difference), exhibiting a molecular weight of 1700 as determined by the ultracentrifuge method, decomposing on heating in the range of 220°–240° C. (turning a tan color), exhibiting $[\alpha]_D$ of $-12°$ (c.=1 in equal volumes of water and methanol), exhibiting when dissolved in 0.1 N HCl at 0.1 mcg./ml. maximum absorption of ultraviolet light at 333–335 m$\mu$ $$(E_{1\,cm.}^{1\%} = 158\text{--}174)$$

and at 274–275 m$\mu$ $$(E_{1\,cm.}^{1\%} = 105\text{--}128)$$

and exhibiting characteristic absorption spectra in the infra-red region of the spectrum when pelleted in potassium bromide as shown in the drawing, including characteristic absorption maxima at the following wave lengths expressed in microns: 2.95, 3.00, 3.23, 3.35, 3.40, 3.47, 5.75, 5.93, 6.03, 6.10, 6.40, 6.46, 6.51, 6.60, 6.62, 6.68, 6.72, 6.84, 6.88, 7.24, 7.30, 7.51, 7.92, 8.02, 8.12, 8.25, 8.40, 8.95, 9.05, 9.40, 9.92, 10.05, 10.15 and 13.30.

4. A sodium salt of the antibiotic substance defined in claim 3.

5. A calcium salt of the antibiotic substance defined in claim 3.

6. A process for the production of a fermentation broth containing telomycin which comprises cultivating a telomycin-producing strain of *Streptomyces canus* in an aqueous carbohydrate solution containing a nitrogenous nutrient under submerged aerobic conditions until substantial antibacterial activity caused by the presence of said antibiotic is imparted to said solution.

7. A process for the production of a fermentation broth containing telomycin which comprises cultivating a telomycin-producing strain of *Streptomyces canus* in an aqueous carbohydrate solution containing a nitrogenous nutrient under submerged aerobic conditions until substantial antibacterial activity caused by the presence of said antibiotic is imparted to said solution, and then recovering said antibiotic from the fermentation broth.

8. The process of claim 7 in which the organism is *Streptomyces canus*, A.T.C.C. 12646.

9. The process of claim 7 in which the organism is *Streptomyces canus*, A.T.C.C. 12647.

10. A process according to claim 7 wherein the recovery of the telomycin includes the steps of extracting the telomycin from fermentation broth with n-butanol, separating the n-butanol and recovering the telomycin therefrom.

11. A process according to claim 7 wherein the recovery of the telomycin includes the steps of adsorbing the antibiotic from filtered fermentation broth at about pH 8.5 on to magnesium silicate, separating the solid cake, eluting the telomycin from the cake with aqueous alcohol and recovering the telomycin from said eluate.

References Cited in the file of this patent

Heinemann et al.: Antibiotics and Chemotherapy, vol. III, No. 12, pp. 1239–1242. Copy in Division 43.